(12) United States Patent
Heckel et al.

(10) Patent No.: US 6,517,654 B1
(45) Date of Patent: *Feb. 11, 2003

(54) PROCESS FOR THE PRODUCTION OF FIBER-REINFORCED SEMI-FINISHED ARTICLES MADE OF THERMOPLASTICS OF MEDIUM TO HIGH VISCOSITY

(76) Inventors: Horst Heckel, Landskronstrasse 50, Darmstadt D-6100 (DE); Detlef Skaletz, Südring 281, Mainz D-6500 (DE); Bruno Wagner, Osterstrasse 4a, Oberbrechen D-6259 (DE); Joachim Heydweiller, Uthmannstrasse 16, Rüsselsheim D-6090 (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1340 days.

(21) Appl. No.: 08/862,682

(22) Filed: May 23, 1997

Related U.S. Application Data

(63) Continuation of application No. 08/462,120, filed on Jun. 5, 1995, now abandoned, which is a continuation of application No. 08/402,545, filed on Mar. 13, 1995, now abandoned, which is a continuation of application No. 08/091,307, filed on Jul. 13, 1993, now abandoned.

(30) Foreign Application Priority Data

Jul. 15, 1992 (DE) .......................................... 42 23 241

(51) Int. Cl.⁷ .............................................. B29C 70/56
(52) U.S. Cl. ...................... 156/166; 156/180; 156/242; 156/245
(58) Field of Search ................................ 156/166, 180, 156/242, 245; 264/136, 171.23

(56) References Cited

U.S. PATENT DOCUMENTS

| | | | | |
|---|---|---|---|---|
| 3,873,389 A | * | 3/1975 | Daniels | 156/181 |
| 3,993,726 A | * | 11/1976 | Moyer | 264/174 |
| 4,312,917 A | * | 1/1982 | Hawley | 264/174 X |
| 4,588,538 A | * | 5/1986 | Chung et al. | 264/237 X |
| 4,728,387 A | * | 3/1988 | Hilakos | 156/166 X |
| 4,894,105 A | * | 1/1990 | Dyksterhouse et al. | 156/181 |
| 4,937,028 A | * | 6/1990 | Glemet et al. | 264/136 |
| 4,957,422 A | * | 9/1990 | Glemet et al. | 425/114 |
| 5,002,712 A | * | 3/1991 | Goldmann et al. | 264/136 X |
| 5,176,775 A | * | 1/1993 | Montsinger | 156/180 X |
| 5,201,979 A | * | 4/1993 | Koba et al. | 156/161 |
| 5,268,050 A | * | 12/1993 | Azari | 156/180 |

FOREIGN PATENT DOCUMENTS

| | | | | |
|---|---|---|---|---|
| EP | 0056703 | | 7/1982 | |
| EP | 0117098 | | 8/1984 | |
| EP | 0287427 | | 10/1988 | |
| EP | 300321 | * | 1/1989 | ................. 156/180 |
| EP | 0364828 | | 4/1990 | |
| EP | 0364829 | | 4/1990 | |
| EP | 0415517 | | 3/1991 | |

OTHER PUBLICATIONS

Proceedings ANTEC '91, pp. 2047–2052, "Pulling Tension Monitoring in Thermoplastics Pultrusion Prepregging/Compounding".

* cited by examiner

*Primary Examiner*—Jeff H. Aftergut
(74) *Attorney, Agent, or Firm*—Frommer Lawrence & Haug LLP; William F. Lawrence; Matthew K. Ryan

(57) ABSTRACT

Fiber-reinforced semi-finished articles made of thermoplastics of medium to high viscosity and a process for their production. To produce a fiber-reinforced composite material, a multiplicity of continuous filaments having single-filament diameters of 7 to 30 micrometers are arranged in parallel in the form of a band and tensioned, and the filament band is wetted by a thermoplastic polymer melt in a melt pultrusion process. In this process, the filament band is pulled over at least two heated spreader surfaces. The viscosity of the melt, measured at low shearing rates, is 105 to 2500 Pa·s. The tension upon entering the first spreader surface is 5 N to 50 N per 4000 single filaments, and the speed of the filament band is at least 3 m/min.

9 Claims, No Drawings

PROCESS FOR THE PRODUCTION OF FIBER-REINFORCED SEMI-FINISHED ARTICLES MADE OF THERMOPLASTICS OF MEDIUM TO HIGH VISCOSITY

This application is a continuation of application Ser. No. 08/462,120, filed on Jun. 5, 1995, now abandoned, which is a contintuation of application Ser. No. 08/402,545, filed on Mar. 13, 1995, now abandoned which is a continuation of application Ser. No. 08/091,307, filed Jul. 13, 1993, now abandoned.

The invention relates to the production of a fiber-reinforced composite material in which a multiplicity of continuous filaments are wetted by a melt of a thermoplastic polymer which during processing has a melt viscosity of >100 Ns/m$^2$ and at most 2500 Pa·s.

The process of European Patent 56703 (ICI) produces a fiber-reinforced, thermoformable composite material comprising a thermoplastic polymer and at least 30% by volume of parallel aligned reinforcing filaments by a pultrusion process. The process is said to make it possible to use conventional thermoplastic materials of high molecular weight for the impregnation of fiber strands. However, the process ceases to be suitable for polymers which exhibit a high viscosity (above 100 Ns/m$^2$) at the processing temperature, because fiber strands can no longer be wetted by such melts in the pultrusion process (see loc cit. p. 3, line 10). For this reason, polymers having very low starting molecular weights are used, so that their use in recycled form does not seem very promising.

Other processes describe impregnation in open systems which are not sealed air-tight, at elevated temperatures causing extensive thermal-oxidative damage to the polymer or enabling only very low production rates. This produces very cost-intensive materials.

Accordingly, the object is to indicate a process which enables thermoformable semi-finished articles to be produced from thermoplastics of medium to fairly high viscosity. Examples of such thermoplastics are poly-propylene, polyamides, polyoxymethylene, polyethylene, polyurethane, polyphenylene sulfide, polyesters, polycarbonate, polyaryl ether ketones and mixtures thereof having the appropriate molecular weight. The process must ensure good wetting of the reinforcing fibers, such as glass, carbon, aramid, steel and ceramic fibers and/or other sufficiently temperature resistant polymer fibers. High viscosity of the melt is a characteristic feature of products having high molecular weight. High molecular weight improves recycling behavior because repeated melting results in a melt which, despite its oxidative and thermal degradation, is still in the high-molecular-weight region.

The present invention achieves this object.

There is accordingly provided a process for the production of a fiber-reinforced composite material in which, in order to form a band, a multiplicity of continuous filaments having single-filament diameters of 7 to 30 micrometers are arranged in parallel and tensioned, the filament band is wetted with a thermoplastic polymer melt in a melt pultrusion process, the filament band being pulled over at least two heated spreader surfaces and the continuous-filament volume content of the solidifying filament band being set at 5 to 70% by volume. In this process, the viscosity of the melt, measured at low shearing rates, is 105 to 2500 Ns/m$^2$ (=Pa·s), the tension upon entering the first spreader surface is 5 N to 50 N per 4000 single filaments and the speed of the filament band is at least 3 m/min. The viscosity of the melt is preferably in the range from 130–2000 Pa·s, in particular 130–500 Pa·s. The single-filament diameter of the continuous filaments is preferably in the range from 7 to 24 $\mu$m. The continuous-filament volume content is preferably 15 to 50% by volume.

It has been found that, as the viscosity of the melt increases, the filament pretension required has to be increased too. At a viscosity of 105 Pa·s, it has to be at least 5 N. It increases too with the filament surface area of the filament strand. The tension on the impregnated filament band at take-off from the last spreader surface is higher than the tension upon entering the first spreader surface and is preferably at least 50 N per 4000 single filaments.

Example 29 of European Patent 56703 already discloses that the tension at which the impregnated fiber band is hauled from a melt of 20 Ns/m$^2$ (and hence from the spreader surface) should be about 3.8 kg (for a strand or roving of 6000 filaments). According to the invention, this take-off tension, i.e. the tension upon entering the first spreader surface, is substantially higher. Take-off tensions ranging from 20 to 80% of the tear strength of the unwetted filament band are preferred.

An advantage of the process according to the invention is that it allows very high impregnation speeds. Impregnation speeds of 3–40 m/min, preferably in the range 10–30 m/min, in particular 10–20 m/min, are preferred for reasons of economy.

Yet the process according to the invention does ensure excellent wetting of the fiber material. X-ray diffraction shows that the proportion of free fiber, i.e. of unwetted fiber surface, is below 25% in the process according to the invention. Determination of the density of the semi-finished article and of the flexural modulus also indicates a high degree of wetting.

In contrast, the impregnation speeds of 0.2–0.6 m/min used in the examples of EP 056703 are substantially lower, although the viscosity of the impregnating melt is much lower, for example 10 Pa·s, which should facilitate wetting of the fiber material.

It is surprising that such a good wetting of the fiber material, which was not believed to be possible, can be achieved at all using melts of high viscosity. It is particularly surprising that this effect is achieved at impregnation speeds which are substantially higher than those of EP 056703 for material of low viscosity.

The principle underlying the invention is still unclear. Perhaps, as a result of the increased tension, the drag flow accompanying the filaments leads to the formation, in the vicinity of the curvatures of the spreader surfaces, of hydrodynamic wedges which generate a forced flow through the filament bundle. This is because it is favorable for the geometry of the spreader surfaces to be such that the nips defined by the spreader surfaces and the incoming band to be filled with melt and for the fiber bundles not to be brought into direct contact with the feed opening for the melt. The melt can be fed in at any desired point of the impregnating device of preferably undulatory design, provided the fibers do not come into contact with this point. The drag flow and superimposed pressure flow produced in the impregnating device result in general in a pressure of at least 1.5 bar between the last spreader surface and the outlet opening of the impregnating device, which constantly ensures complete filling of the impregnating device.

The process according to the invention is surprising in that it could not be expected that such high tensions on the fibers and the absence of contact between the fibers and the feed opening for the melt would permit the use of such highly viscous polymers and hence the achievement of such a high impregnation quality. What is particularly surprising is that the impregnation speeds achieved by this method are very much higher.

The fiber volume content of the semi-finished article can be controlled by adjusting the feed rate of the polymer melt, relative to the filament speed. Furthermore, superfluous amounts of polymer melt can be scraped off by means of perforated plates.

The undirectionally parallel aligned multifilament reinforcing fibers which are required for the process according to the invention are unwound from bobbins as rovings with a controlled take-off force. The control can be effected mechanically, mechano-physically, electrically or electronically. This directly applied take-off pretension is usually in the range from 10 N to about 25 N, depending on the type of roving used and the thickness of the fiber.

It has been found that the take-off tension, once established, should advantageously be kept constant.

A device which, inter alia, is suitable for keeping the take-off tension constant mechanically forms the subject of German Utility Model 9 107 510.6 (Bolenz & Schäfer Maschinenfabrik GmbH).

If required, the pretension can be further increased by inserting one or more further pairs of tension rods between bobbin and impregnating device. This ensures the time- and also roving-dependent constancy of the pretension.

Varying the number, diameter and position of the tension rods determining the wrap angle makes it possible to change the take-off tension required for conveying the filaments within wide limits. This tension keeps on increasing starting from the bobbin, toward the braking system, guide element/combs up to the deflecting rods in front of the first spreader surface. After the filament has been wetted, the tension keeps increasing further (toward the take-up bobbin for the composite material).

The fibers thus pre-tensioned and aligned in parallel then enter the impregnating device, in particular an impregnating die. In order to accelerate throughput, the fibers can be preheated. Temperatures of up to 100 K. below or above the processing temperature of the melt have proven suitable. Heating of the filaments can take place by infrared, contact, radiation, steam, water or hot-gas preheating.

Devices equipped with spreader surfaces for impregnating fiber material are known. U.S. Pat. No. 4,439,387 describes an extruder in which a plurality of fiber strands are fed into the inside of the apparatus, which is filled with polymer melt, at different points which are arranged in succession along the conveying direction of the melt and are impregnated there with melt. The spreader surfaces 212, 214 and 216 are said to improve the wetting of the fiber strands by the melt.

Apparatus which is highly suitable for carrying out the process according to the invention is described in U.S. Pat. No. 4,957,422. The chicane (b) shown in FIG. 1 in the inlet (1) of the apparatus (before wetting by the melt) can be dispensed with in the process according to the invention.

The impregnating device used is preferably essentially closed, so that ingress of atmospheric oxygen and the resulting thermal-oxidative damage to the polymer can be minimized. Inside the impregnating device, the fibers are preferably pulled over at least three spreader surfaces of undulatory design.

By using a wide impregnating die, a multiplicity of individual filament bands can be obtained. If a slot die is used, the entirety of wetted filament bands can also be combined to give a single band which is then passed to polishing rolls. The slot opening of the slot die can be, for example, between 0.15–5, in particular 0.4–2 mm. The individual strands can be shaped by controlled roll systems and be given, for example, a rectangular, elliptical or circular cross section.

It is possible to produce semi-finished articles in the form of continuous, wide tapes of up to 500 mm, preferably 100 to 320 mm, with thicknesses of between 0.2 and 0.7 mm, and also profiles in a wide range of dimensions (flat profiles 25×0.25 mm, 5×0.4 mm, 3.5×0.8 mm, and the like, round profiles up to diameters of about 5 mm) produced in single or multiple strands, or strands having diameters of up to 5 mm which can then be cut to give lengthwise portions (pellets) of 3 to 100 mm, preferably 10 to 50 mm. These strands too can be produced as a single semi-finished article or in parallel and simultaneously in a number of up to 150 strands. The invention is illustrated by the examples.

EXAMPLE 1

A glass fiber filament band (E-glass OCF 157) was pultruded at a high tension (15 N/4000 single filaments, measured on entering the first spreader surface) together with a polypropylene (=PP) melt having a viscosity of 370 Pa·s (speed of the filament tape 3.3 m/min). The composite material obtained had a weight of 4.420 g/m. The glass content determined by ashing was 47.3% by weight. The PP content calculated therefrom is 2.330 g/m and the glass content is 2.090 g/m. The volume of the composite material determined hydrostatically was 3.451 cm$^3$/m. The density of the composite material calculated therefrom and from the weight per m is 1.281 g/cm$^3$. The density of the PP is 0.907 g/cm$^3$ and that of the glass 2.588 g/cm$^3$.

The porosity is calculated by the formula $$\% \text{ by volume of pores} = 100 \cdot (1 - Wg/dg + Wp/dp) : V.$$

In this formula,

Wg is the weight of the glass component/m dg is the density of the glass

Wp is the weight of the polymer component/m dp is the density of the polymer

V is the volume/m.

In the example, the calculated porosity is 2.15% by volume.

In a comparative experiment with unmodified introduction of PP melt and filament material, the tension was reduced to about 5 N/strand. The composite material obtained had a weight of 4.214 g/m. Ashing revealed a glass content of 49.2% by weight. The volume of the composite material determined hydrostatically was 3.379 cm$^3$/m. The porosity calculated therefrom was 6.45% by volume.

As shown by the comparison, determination of the strand weight (mass per unit length) alone does not result in a reliable determination of the pore volume. On reducing the originally high take-off tension, the porosity increases by a factor of about 3.

EXAMPLE 2

In a pultrusion unit, polypropylene having a melt flow index of 12 (230/2.16) and a viscosity of 370 Pa·s (measured at 285°C.) was melted and pressed onto a glass fiber strand subjected to uniform take-off tension. The shaping by the outlet produces an oval cross section (width about 3.47 mm, thickness about 2.59 mm). The temperature of the PP melt measured at the outlet of the apparatus was 278° C. The linear speed of the pultruded strand is 9.88 m/min and the pretension 20 N. The fiber strand obtained is cut into portions about 14 cm in length. These portions are subjected to bending tests in accordance with ASTM D790-80. The portions have a maximum bending stress of 181±19 MPa and a modulus of elasticity (measured at 0.05 to 1.0% e) of 7000±800 MPa.

If in contrast the pretension in the same experiment is educed to 5 N during production of the pultruded strand, nalogous specimen portions show a maximum bending stress of only 110±41 MPa and a modulus of elasticity of 900±2430 MPa.

EXAMPLE 3

In a pultrusion unit, polypropylene having a melt flow index of 12 (230/2.16) and a viscosity of 370 Pa·s is melted and pressed onto a glass fiber strand taken off at uniform take-off tension. The shaping by the outlet produces a rectangular cross section of 5×0.4 mm. The temperature of the PP melt measured at the outlet of the apparatus was 282° C. The linear speed of the pultruded strand was 27 m/min and the pretension 20 N. The tensile strength of the profiles thus produced, determined in accordance with DIN 53 455, is 945 MPa and the modulus of elasticity in tension is 36.1 GPa.

What is claimed is:

1. A process for the production of a fiber-reinforced composite material in an impregnation device, which, in order to form a filament band, comprises:

pulling a multiplicity of continuous filaments having single-filament diameters of 7 to 30 micrometers, which are arranged in parallel and tensioned, over heated spreader surfaces including a first spreader surface, the spreader surfaces and the filament band defining nips, wherein the filament band upon entering the first spreader surface has a tension of from 5 N to 50 N per 4000 single filaments and a speed of at least 3 m/min, said tension and speed achieved by pulling the filament band, feeding a thermoplastic polymer melt, having a viscosity of 105 to 2500 Pa·s, measured at a low shearing rate, through a feed opening in the device, wherein the feed opening for the melt is not in contact with the continuous filaments, dragging the melt into the nips with the pulled filament band, which is brought into contact with the melt prior to the contact with the first spreader surface, wherein the tension and the speed of the band press melt through the band, thus effectively impregnating the filament band, and then cooling the band to provide a solidifying melt impregnated filament band with a content of continuous filaments of from 5 to 70% by volume.

2. The process as claimed in claim 1, wherein a tension of the impregnated filament band at take-off from the last spreader surface is at least 50 N per 4000 single filaments.

3. The process as in claim 1, wherein the speed of the filament band is from 10 to 30 m/min.

4. A process for the production of a fiber-reinforced composite material in an impregnation device comprising the steps of:

pulling a multiplicity of continuous filaments, which have a filament diameter in the range of from about 7 to 24 μm and which are arranged in parallel to form a filament band, over a multiplicity of heated spreader surfaces, including a first and last spreader surface, thereby generating a tension on the filament band, and the filament band and the spreader surfaces defining nips;

feeding a thermoplastic polymer melt through a feed opening into the device and dragging the melt into the nips, thereby pressing the melt through the band to effectively impregnate the filament band;

and cooling the filament band to provide a solidifying melt impregnated filament band; wherein
   the filament band is pulled through the impregnation device at a speed of at least 3 m/min over at least three spreader surfaces of undulatory design,
   the thermoplastic polymer melt has a viscosity of 105 to 2500 PA·s, measured at a low shear rate,
   the feed opening is not in contact with the filaments,
   the filaments are brought into contact with the thermoplastic polymer melt prior to a contact with the first spreader surface,
   upon entering the first spreader surface the tension of the impreated filament band is from 5N to 50N per 4000 single filaments,
   at take-off from the last spreader surface, the tension of the impregnated filament band is at least 50N per 4000 single filaments and,
   the impregnated filament band has a content of continuous filaments from 5 to 50% by volume.

5. The process as claimed in claim 4, wherein the impregnation device is completely filled with the thermoplastic polymer melt.

6. The process as claimed in claim 4, wherein said viscosity is approximately 130 to 2000 Pa·s.

7. The process as claimed in claim 4, wherein said speed is approximately 10–30 m/min.

8. The process as claimed in claim 4, wherein the tension of the filament band upon entering the first spreader surface is approximately 20 to 80% of a tear strength of the filament band before impregnation.

9. The process as claimed in claim 4, wherein said impregnated filament band has a portion of free fiber surface determined by x-ray diffraction of less than 25%.

* * * * *